United States Patent
Yazdi et al.

(10) Patent No.: US 11,075,578 B1
(45) Date of Patent: Jul. 27, 2021

(54) INDUCTOR CURRENT BASED MODE CONTROL FOR CONVERTER CIRCUIT

(71) Applicant: SHENZHEN GOODIX TECHNOLOGY CO., LTD., Shenzhen (CN)

(72) Inventors: Siavash Yazdi, San Diego, CA (US); Esmail Babakrpur Nalousi, San Diego, CA (US); Ahmed Emira, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/735,667

(22) Filed: Jan. 6, 2020

(51) Int. Cl.
*H02M 3/156* (2006.01)
*H02M 1/00* (2006.01)

(52) U.S. Cl.
CPC .......... *H02M 3/156* (2013.01); *H02M 1/0009* (2021.05); *H02M 1/0025* (2021.05)

(58) Field of Classification Search
None
See application file for complete search history.

(56) References Cited

U.S. PATENT DOCUMENTS

| 8,971,060 | B2 | 3/2015 | Wu et al. | |
| 10,715,039 | B1* | 7/2020 | Ilango | H02M 3/158 |
| 2011/0260537 | A1* | 10/2011 | Tang | H02M 3/158 |
| | | | | 307/55 |
| 2013/0320951 | A1* | 12/2013 | Wu | H02M 3/1584 |
| | | | | 323/311 |
| 2019/0020275 | A1* | 1/2019 | Childs | H02M 1/08 |

FOREIGN PATENT DOCUMENTS

| CN | 1881763 | A | 12/2006 |
| CN | 102735906 | A | 10/2012 |
| CN | 102904424 | A | 1/2013 |
| CN | 103269159 | A | 8/2013 |
| CN | 109818498 | A | 5/2019 |

\* cited by examiner

*Primary Examiner* — Jeffrey A Gblende
(74) *Attorney, Agent, or Firm* — Kilpatrick Townsend & Stockton LLP

(57) ABSTRACT

A converter circuit includes a pull up component, a pull down component, and a controller configured to operate the pull up component and the pull down component so as to deliver power to a load. The controller is configured to operate the pull up and pull down components in first and second operational modes, based on an average current delivered to the load. The converter circuit also includes a mode control circuit to generate a mode control signal based in part on a representation of a peak current received at the switch node from the pull up component.

16 Claims, 3 Drawing Sheets

INDUCTOR CURRENT BASED MODE CONTROL FOR CONVERTER CIRCUIT

FIELD OF THE INVENTION

The present application generally pertains to converter circuits, and more particularly to converter circuits which switch between a pulse frequency modulation (PFM) operational mode and a continuous conduction mode (CCM) operational mode.

BACKGROUND OF THE INVENTION

Certain data converters operate in either a pulse frequency modulation (PFM) operational mode or a continuous conduction mode (CCM) operational mode. The PFM operational mode may be preferentially used for relatively low current load conditions, and the CCM operational mode may be preferentially used for relatively high load conditions. Techniques for determining current load conditions are needed to effectively control the operational mode.

BRIEF SUMMARY OF THE INVENTION

One aspect is a converter circuit. The converter circuit includes a pull up component to cause a voltage at a switch node to be substantially equal to a voltage at a positive power supply, a pull down component to cause the voltage at the switch node to be substantially equal to a voltage at a negative power supply, a controller configured to operate the pull up component and the pull down component so as to deliver power to a load. The controller is configured to operate the pull up component and the pull down component in either of first and second operational modes, where the first operational mode is preferred if an average current delivered to the load is greater than a current threshold, and where the second operational mode is preferred if the average current delivered to the load is less than the current threshold. The converter circuit also includes a mode control circuit to generate a mode control signal based in part on a representation of a peak current received at the switch node from the pull up component, where the controller is configured to operate the pull up component and the pull down component in either of the first and second operational modes based on the mode control signal.

Another inventive aspect is a method of operating a converter circuit, the converter circuit including a switch node, a pull up component, a pull down component, a controller, and a mode control circuit. The method includes, with the pull up component, causing a voltage at the switch node to be substantially equal to a voltage at a positive power supply, where turning off the pull up component causes the voltage at the switch node to decrease with the pull down component. The method also includes causing the voltage at the switch node to be substantially equal to a voltage at a negative power supply, where turning off the pull down component causes the voltage at the switch node to increase. The method also includes, with the controller, operating the pull up component and the pull down component so as to deliver power to a load. The method also includes, with the controller, operating the pull up component and the pull down component in either of first and second operational modes, where the first operational mode is preferred if an average current delivered to the load is greater than a current threshold, and where the second operational mode is preferred if the average current delivered to the load is less than the current threshold. The method also includes, with the mode control circuit, generating a mode control signal based in part on a representation of a peak current received at the switch node from the pull up component, and, with the controller operating the pull up component and the pull down component in either of the first and second operational modes based on the mode control signal.

BRIEF DESCRIPTION OF THE DRAWINGS

FIG. 3 is a schematic plot indicating time periods during which the pull up component of the converter circuit of FIG. 1 is off, and during which the pull down component of the converter circuit of FIG. 1 is on.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1:
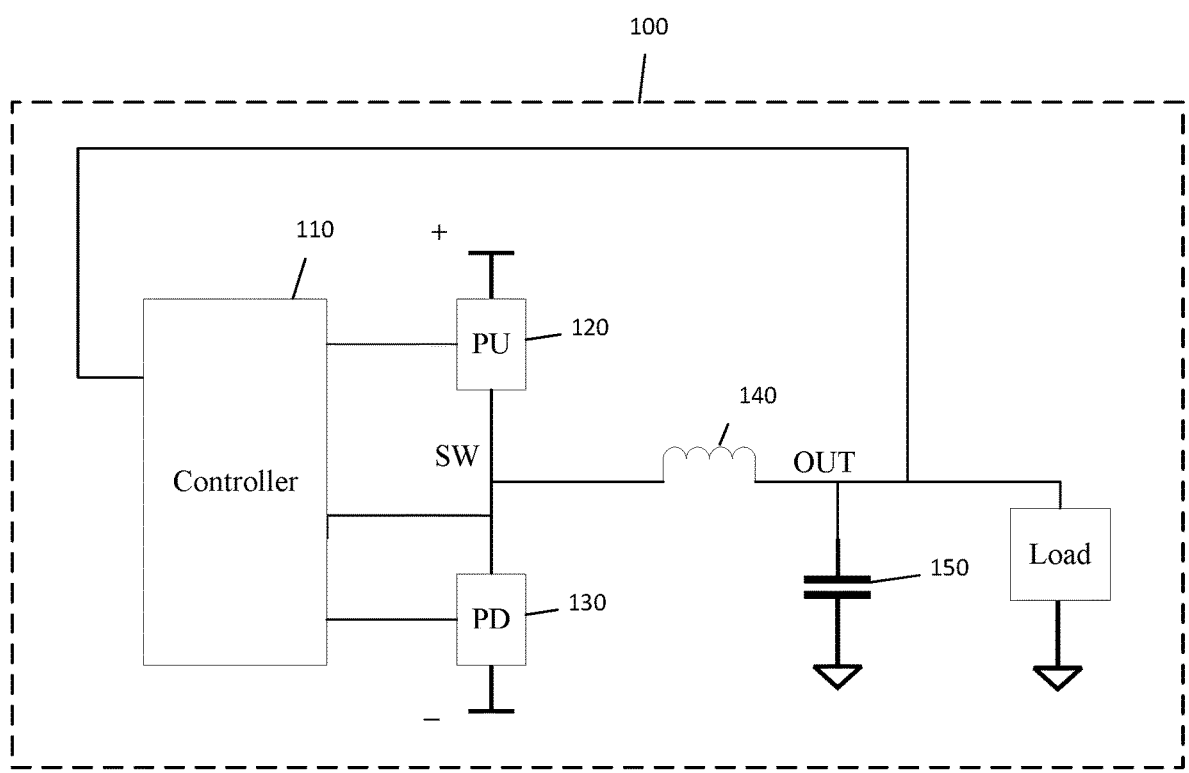
FIG. 1 is a schematic diagram of a converter circuit configured to operate in either a pulse frequency modulation (PFM) operational mode or a continuous conduction mode (CCM).

FIG. 1 is a schematic diagram of a converter circuit 100 configured to operate in either a pulse frequency modulation (PFM) operational mode or a continuous conduction mode (CCM). The illustrated circuit is an example only. The principles and aspects discussed herein may be applied to other convert circuits, as understood by those of skill in the art.

Converter circuit 100 includes controller 110, pull up component 120, pull down component 130, inductor 140, and capacitor 150.

Converter circuit 100 generates a substantially DC voltage at output node OUT by controlling the switching operations of pull up component 120 and pull down component 130. As understood by those of skill in the art, pull up component 120 causes the voltage at node SW to be substantially equal to the voltage at the positive power supply, and turning off pull up component 120 causes the voltage at node SW to decrease because of the continuous current in inductor 140. Similarly, pull down component 130 causes the voltage at node SW to be substantially equal to the voltage at the negative power supply, and turning off pull down component 130 causes the voltage at node SW to increase because of the continuous current in inductor 140.

While operating in PFM mode, during each cycling period, the controller 110 causes the voltage at node SW to be substantially or about equal to the voltage of the positive power supply for a first duration T1 and to be substantially or about equal the voltage of the negative power supply for a second duration T2. During a third duration T3, the voltage at node SW is not cause to be substantially or about equal to the voltage of the positive power supply or to the voltage of the negative power supply. The first and second durations T1 and T2 have substantially fixed lengths, and converter circuit 100 influences the voltage at output node OUT by controlling and adjusting the third duration T3. For example, in response to an indication that the voltage at output node OUT is too low, controller 110 may decrease the third duration T3. Likewise, in response to an indication that the voltage at output node OUT is too high, controller 110 may increase the third duration T3. The frequency associated with the cycling period is therefore adjusted to cause the target voltage value at the output node OUT.

While operating in CCM mode, during each cycling period, the controller 110 causes the voltage at node SW to be substantially or about equal to the voltage of the positive power supply for a first duration T1 and to be substantially or about equal the voltage of the negative power supply for a second duration T2. The sum of the first duration T1 and the second duration T2 is fixed. Converter circuit 100 influences the voltage at output node OUT by controlling and adjusting the first and second durations T1 and T2, without changing the sum of the first and second durations T1 and T2. For example, in response to an indication that the voltage at output node OUT is too low, controller 110 increases the first duration T1 and decreases the second duration T2. Likewise, in response to an indication that the voltage at output node OUT is too high, controller 110 decreases the first duration T1 and increases the second duration T2. Accordingly, the frequency associated with the cycling period during CCM operation is fixed, and the duty cycle is adjusted to cause the target voltage value at the output node OUT.

The PFM operational mode may be preferentially used for relatively low current load conditions, and the CCM operational mode may be preferentially used for relatively high load conditions. Accordingly, a measurement of load current can be used to determine which mode the converter circuit 100 is to be operated in.

Load current, however, may be difficult or impractical to determine. Instead, average inductor current may be used as a proxy for load current. And, as shown below, other circuit signals may be used as an indication of average inductor current.

FIGS. 2-5 are schematic plots which are referenced to establish that the other circuit signals may be used as an indication of average inductor current using geometric principles. In this example, the converter 100 is operating in PFM mode.

Figure 2:
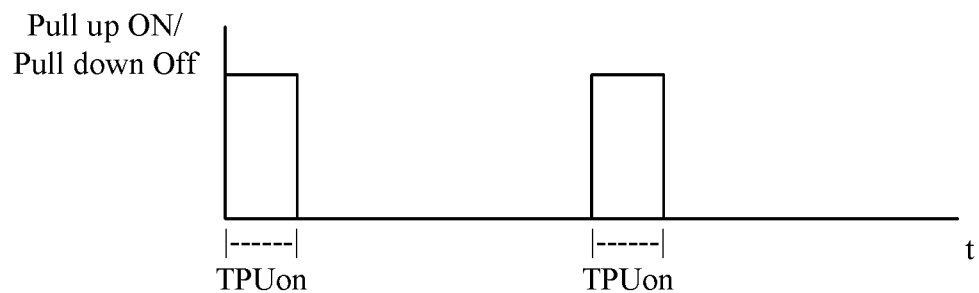
FIG. 2 is a schematic plot indicating time periods during which the pull up component of the converter circuit of FIG. 1 is on, and during which the pull down component of the converter circuit of FIG. 1 is off.

FIG. 2 is a schematic plot indicating time periods during which pull up component 120 is on, and during which pull down component 130 is off.

Figure 3:
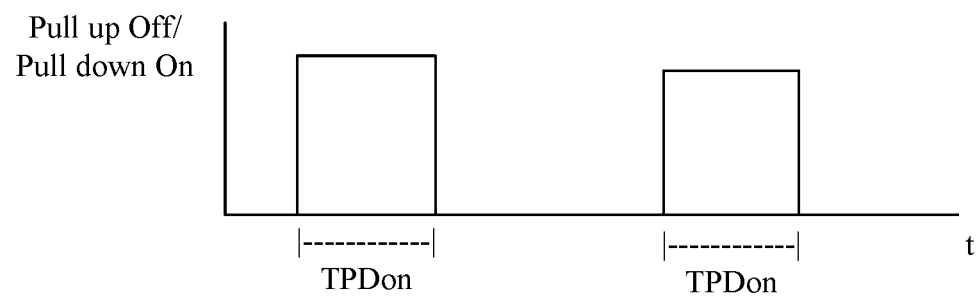

FIG. 3 is a schematic plot indicating time periods during which pull up component 120 is off, and during which pull down component 130 is on.

Figure 4:
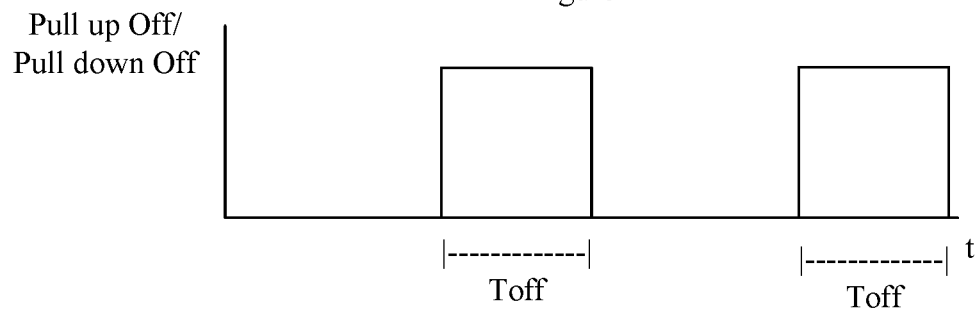
FIG. 4 is a schematic plot indicating time periods during which the pull up component of the converter circuit of FIG. 1 is off, and during which the pull down component of the converter circuit of FIG. 1 is off.

FIG. 4 is a schematic plot indicating time periods during which pull up component 120 is off, and during which pull down component 130 is off.

Figure 5:
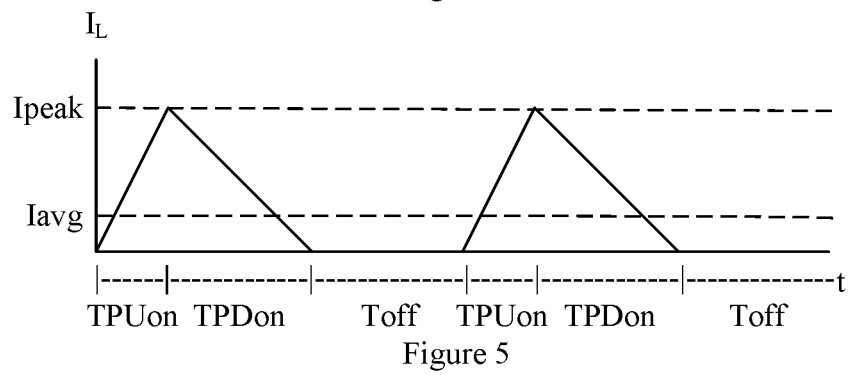
FIG. 5 is a schematic plot of the current of the inductor of the converter circuit of FIG. 1.

FIG. 5 is a schematic plot of the current of inductor 140, as derived based on the various time periods indicated in FIGS. 2, 3, and 4.

During the time periods indicated in FIG. 2, during which pull up component 120 is on and pull down component 130 is off, the voltage at node SW is substantially or about equal to the voltage at the positive power supply. Because the voltage at the output node OUT may be considered DC, the current of inductor 140 increases substantially or about linearly from a minimum value or zero to a peak value Ipeak.

During the time periods indicated in FIG. 3, during which pull up component 120 is off and pull down component 130 is on, the voltage at node SW is substantially or about equal to the voltage at the negative power supply. Because the voltage at the output node OUT may be considered DC, the current of inductor 140 decreases substantially or about linearly from the peak value Ipeak to a minimum value or zero.

During the time periods indicated in FIG. 4, during which pull up component 120 is off and pull down component 130 is off, the voltage at node SW is substantially or about equal to the voltage at the output node OUT. Therefore, the current of inductor 140 is a minimum value or zero.

Using geometric principles well understood in the art, during the time periods indicated in FIG. 2, during which pull up component 120 is on and pull down component 130 is off, the average current of inductor 140 is equal to Ipeak/2. Similarly, during the time periods indicated in FIG. 3, during which pull up component 120 is off and pull down component 130 is on, the average current of inductor 140 is also equal to Ipeak/2. In addition, during the time periods indicated in FIG. 4, during which pull up component 120 is off and pull down component 130 is off, the current of inductor 140 is a minimum value or zero.

Accordingly, the average current Iavg of inductor 140 is shown by:

$$Iavg=Ipeak/2\times(TPUon+TPDon)/(TPUon+TPDon+Toff),$$

where TPUon is equal to the duration of the time periods indicated in FIG. 2, during which pull up component 120 is on and pull down component 130 is off, TPDon is equal to the duration of the time periods indicated in FIG. 3, during which pull up component 120 is off and pull down component 130 is on, and Toff is equal to the duration of the time periods indicated in FIG. 4, during which pull up component 120 is off and pull down component 130 is off.

Figure 6:
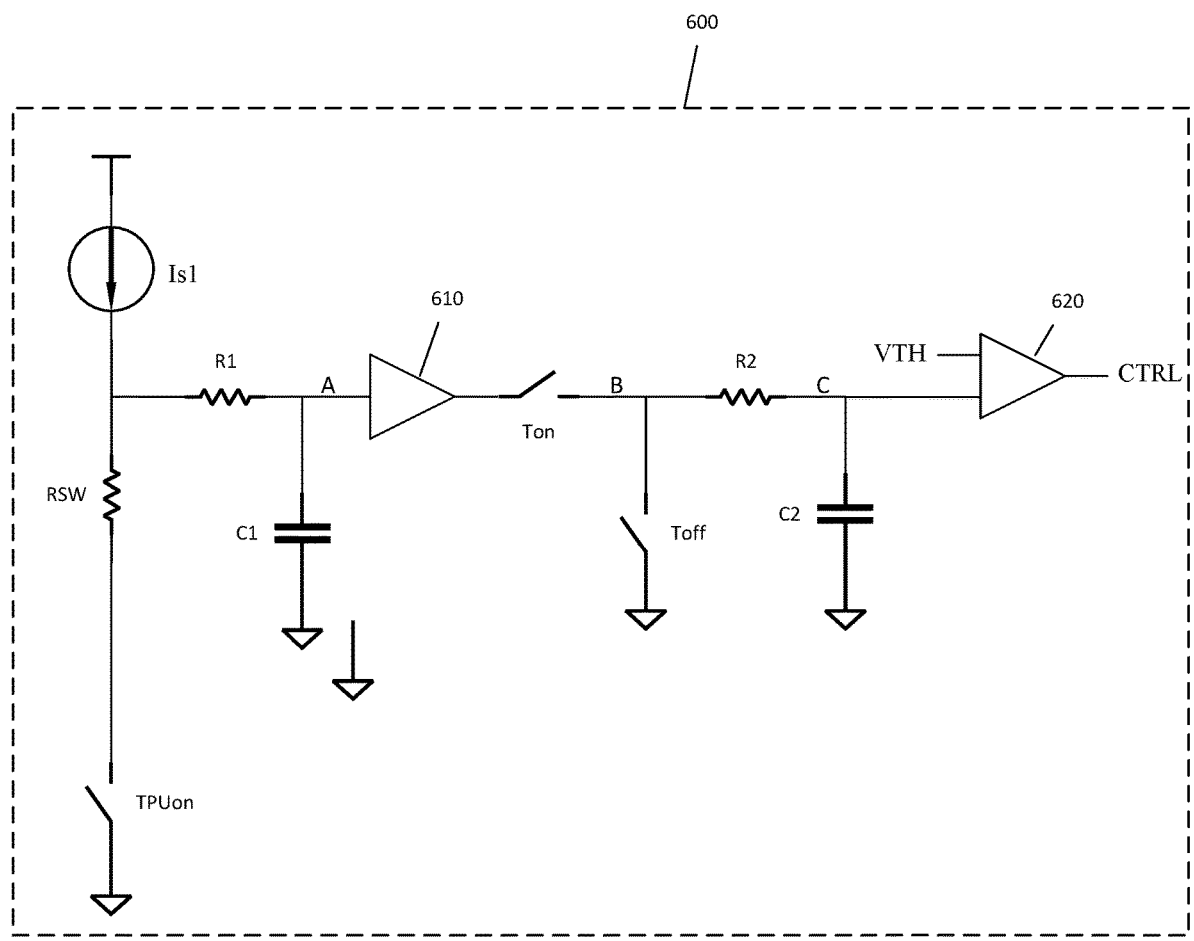
FIG. 6 is a schematic diagram of an embodiment of a mode control circuit configured to control the operational mode of converter circuit of FIG. 1 according to inductor current.

FIG. 6 is a schematic diagram of an embodiment of a mode control circuit 600 configured to control the operational mode of converter circuit 100 of FIG. 1 according to inductor current. Mode control circuit 600 may be implemented, for example, as part of the controller 110.

Mode control circuit 600 includes current source Is1, resistor RSW, switch TPUon, resistor R1, capacitor C1, buffer 610 and switch Ton, switch Toff, resistor R2, capacitor C2, and comparator 620.

In some embodiments, current source Is1 has a current value which corresponds with the current of the pull up component 120, as determined and controlled by a current sensing circuit, such as any current sensing and controlling circuit known in the art. For example, current source Is1 may have a current value which is determined by a scaled down version of pull up component 120, such that the current of current source Is1 is substantially proportional to the current of the pull up component 120.

In some embodiments, current source Is1 sources current during the time periods indicated in FIG. 2, during which pull up component 120 is on and pull down component 130 is off (TPUon), and sources no current outside of those time periods. Accordingly, in such embodiments, the mode control circuit 600 is configured to control the operational mode of converter circuit 100 of FIG. 1 based on the inductor current during only a portion of each inductor current cycle—those TPUon time periods indicated in FIG. 2.

Controller 110 also controls switch TPUon so that switch TPUon is conductive during the time periods indicated in FIG. 2, during which pull up component 120 is on and pull down component 130 is off (TPUon).

As a result, the voltage at node A corresponds with the average current of inductor 140 during the TPUon time period, where, as discussed above, the average current of inductor 140 during the TPUon time period is equal to Ipeak/2. As understood by those of skill in the art, if the time periods indicated in FIG. 2, during which pull up component 120 is on and pull down component 130 is off (TPUon), are increased, the voltage at node A likewise increases. Similarly, if the time periods indicated in FIG. 2, during which pull up component 120 is on and pull down component 130 is off (TPUon), are decreased, the voltage at node A likewise decreases.

Controller 110 control switches Ton and Toff so that buffer 610 and switch Ton cause the voltage at node B to be equal to the voltage at node A during the time periods indicated in FIGS. 2 and 3, during which either pull up component 120 is on or pull down component 130 is on (Ton=TPUon+TPDon). In addition, controller 110 controls switches Ton and Toff so that switch Toff causes the voltage at node B to be equal to the ground voltage during the time periods indicated in FIG. 4, during which pull up component 120 is off and pull down component 130 is off (Toff).

In addition, as understood by those of ordinary skill in the art, because of the filter formed by resistor R2 and capacitor C2, the voltage at node C is substantially equal to the average voltage at node B, where the voltage at node B is substantially equal to the voltage at node A times (TPUon+TPDon)/(TPUon+TPDon+Toff). Therefore, because the voltage at node A corresponds with Ipeak/2, the voltage at node C corresponds with Ipeak/2×(TPUon+TPDon)/(TPUon+TPDon+Toff), which is equal to the average current of the inductor 140.

Comparator 620 is configured to compare the voltage at node C with a threshold voltage at node VTH and to generate a control signal at node CTRL. In response to the voltage at node C being less than the threshold voltage at node VTH (indicating that the load current is less than a PFM-CCM current load threshold), the comparator generates a control signal at node CTRL which causes controller 110 to operate the pull up component 120 and the pull down component 130 such that the converter functions in a pulse frequency mode (PFM). In response to the voltage at node C being greater than the threshold voltage at node VTH (indicating that the load current is greater than a PFM-CCM current load threshold), the comparator generates a control signal at node CTRL which causes controller 110 to operate the pull up component 120 and the pull down component 130 such that the converter functions in a continuous conduction mode (CCM).

In some embodiments, comparator 620 is hysteretic, such that the control signal at node CTRL does not switch between the two mode control values in response to small variations in the voltage at node C when the voltage at node C is near the threshold voltage at node VTH.

As understood by those of ordinary skill in the art, complementary switching devices, such as pull up component 120 and pull down component 130 of FIG. 1, and such as switches Ton and Toff of FIG. 6 may be operated so as to prevent both of the complementary switching devices on simultaneously. For the discussions herein, the brief period of time between one of the complementary switching devices turning off and the other of the complementary switching devices turning on (the dead time) is considered to be in either of the adjacent time periods, as understood by one of ordinary skill in the art.

In the example illustrated with reference to FIGS. 2-6, the converter 100 is operating in PFM mode. As understood by those of skill in the art, the mode controlling functionality of the mode control circuit 600 will likewise properly control the operating mode when the converter 100 is operating in CCM. As understood by those of ordinary skill in the art, during CCM mode, there will be no Toff time. Accordingly, switch Toff of FIG. 6 will be continuously open, and switch Ton of FIG. 6 will be continuously conductive.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A converter circuit, comprising:
   a switch node;
   a pull up component configured to cause a voltage at the switch node to be substantially equal to a voltage at a positive power supply, wherein turning off the pull up component causes the voltage at the switch node to decrease;
   a pull down component configured to cause the voltage at the switch node to be substantially equal to a voltage at a negative power supply, wherein turning off the pull down component causes the voltage at the switch node to increase;
   a controller configured to operate the pull up component and the pull down component so as to deliver power to a load, where the controller is configured to operate the pull up component and the pull down component in either of first and second operational modes, wherein the first operational mode is selected in response to an average current delivered to the load being greater than a current threshold, and wherein the second operational mode is selected in response to the average current delivered to the load being less than the current threshold; and
   a mode control circuit configured to generate a mode control signal based in part on a representation of a peak current received at the switch node from the pull up component,
   wherein the controller is configured to operate the pull up component and the pull down component in either of the first and second operational modes based on the mode control signal,
   wherein the mode control circuit comprises a peak current circuit configured to generate a signal at a first node, wherein the signal that the first node is generated based on the peak current received at the switch node from the pull up component,
   wherein the peak current circuit comprises a current source configured to source current to the first node while the pull up component delivers current to the switch node, and wherein a magnitude of a current of the current source is proportional to a current delivered by the pull up component to the switch node.

2. The converter circuit of claim 1, wherein the first operational mode is a continuous conduction mode.

3. The converter circuit of claim 1, wherein the second operational mode is a pulse frequency modulation mode.

4. A converter circuit, comprising:
a switch node;
a pull up component configured to cause a voltage at the switch node to be substantially equal to a voltage at a positive power supply, wherein turning off the pull up component causes the voltage at the switch node to decrease;
a pull down component configured to cause the voltage at the switch node to be substantially equal to a voltage at a negative power supply, wherein turning off the pull down component causes the voltage at the switch node to increase;
a controller configured to operate the pull up component and the pull down component so as to deliver power to a load, where the controller is configured to operate the pull up component and the pull down component in either of first and second operational modes, wherein the first operational mode is selected in response to an average current delivered to the load being greater than a current threshold, and wherein the second operational mode is selected in response to the average current delivered to the load being less than the current threshold; and
a mode control circuit configured to generate a mode control signal based in part on a representation of a peak current received at the switch node from the pull up component,
wherein the controller is configured to operate the pull up component and the pull down component in either of the first and second operational modes based on the mode control signal,
wherein the mode control circuit comprises a peak current circuit configured to generate a signal at a first node, wherein the signal that the first node is generated based on the peak current received at the switch node from the pull up component,
wherein the mode control circuit comprises a weighting circuit configured to multiply the signal at the first node substantially by a ratio of an on time to a period time to generate a weighted signal at a second node, wherein the on time is equal to a duration of time when either the pull up component or the pull down component are conductive during a cycling period, and wherein the period time is equal to the total duration of the cycling period.

5. The converter circuit of claim 4, wherein the weighting circuit comprises:
a buffer configured to drive a third node with a voltage at the first node during the on time; and
a switch configured to connect the third node to a ground voltage while the buffer is not driving the third node with the voltage at the first node.

6. The converter circuit of claim 4, wherein the mode control circuit comprises a comparison circuit configured to compare the weighted signal at the second node with a mode control threshold to generate the mode control signal.

7. The converter circuit of claim 6, wherein the comparison circuit comprises a comparator configured to compare the mode control signal such that if the weighted signal at the second node is greater than the mode control threshold, the mode control signal causes the controller to operate the pull up component and pull down component in the first operational mode.

8. The converter circuit of claim 6, wherein the comparison circuit comprises a comparator configured to the mode control signal such that if the weighted signal at the second node is less than the mode control threshold, the mode control signal causes the controller to operate the pull up component and pull down component in the second operational mode.

9. A method of operating a converter circuit, the converter circuit comprising:
a switch node;
a pull up component;
a pull down component;
a controller; and
a mode control circuit,
the method comprising:
with the pull up component, causing a voltage at the switch node to be substantially equal to a voltage at a positive power supply, wherein turning off the pull up component causes the voltage at the switch node to decrease
with the pull down component, causing the voltage at the switch node to be substantially equal to a voltage at a negative power supply, wherein turning off the pull down component causes the voltage at the switch node to increase;
with the controller, operating the pull up component and the pull down component so as to deliver power to a load;
with the controller, operating the pull up component and the pull down component in either of first and second operational modes, wherein the first operational mode is selected in response to an average current delivered to the load is greater than a current threshold, and wherein the second operational mode is selected in response to the average current delivered to the load is less than the current threshold;
with the mode control circuit, generating a mode control signal based in part on a representation of a peak current received at the switch node from the pull up component; and
with the controller operating the pull up component and the pull down component in either of the first and second operational modes based on the mode control signal,
wherein the mode control circuit comprises a peak current circuit, and the method further comprises, with the peak current circuit, generating a signal at a first node, wherein the signal that the first node is generated based on the peak current received at the switch node from the pull up component,
wherein the peak current circuit comprises a current source, and the method further comprises, with the current source, sourcing current to the first node while the pull up component delivers current to the switch node, and wherein a magnitude of the current of the current source is proportional to the current delivered by the pull up component to the switch node.

10. The method of claim 9, wherein the first operational mode is a continuous conduction mode.

11. The method of claim 9, wherein the second operational mode is a pulse frequency modulation mode.

12. A method of operating a converter circuit, the converter circuit comprising:

a switch node;
a pull up component;
a pull down component;
a controller; and
a mode control circuit,
the method comprising:
- with the pull up component, causing a voltage at the switch node to be substantially equal to a voltage at a positive power supply, wherein turning off the pull up component causes the voltage at the switch node to decrease
- with the pull down component, causing the voltage at the switch node to be substantially equal to a voltage at a negative power supply, wherein turning off the pull down component causes the voltage at the switch node to increase;
- with the controller, operating the pull up component and the pull down component so as to deliver power to a load;
- with the controller, operating the pull up component and the pull down component in either of first and second operational modes, wherein the first operational mode is selected in response to an average current delivered to the load is greater than a current threshold, and wherein the second operational mode is selected in response to the average current delivered to the load is less than the current threshold;
- with the mode control circuit, generating a mode control signal based in part on a representation of a peak current received at the switch node from the pull up component; and
- with the controller operating the pull up component and the pull down component in either of the first and second operational modes based on the mode control signal,
wherein the mode control circuit comprises a peak current circuit, and the method further comprises, with the peak current circuit, generating a signal at a first node, wherein the signal that the first node is generated based on the peak current received at the switch node from the pull up component,
wherein the mode control circuit comprises a weighting circuit, and the method further comprises, leaving circuit multiplying the signal at the first node substantially by a ratio of an on time to a period time to generate a weighted signal at a second node, wherein the on time is equal to a duration of time when either the pull up component or the pull down component are conductive during a cycling period, and wherein the period time is equal to the total duration of the cycling period.

13. The method of claim 12, wherein the weighting circuit comprises a buffer and a switch, and wherein the method further comprises:
- with the buffer, driving a third node with a voltage at the first node during the on time; and
- with the switch, connecting the third node to a ground voltage while the buffer is not driving the third node with the voltage at the first node.

14. The method of claim 12, wherein the mode control circuit comprises a comparison circuit, and the method further comprises, with the comparison circuit, comparing the weighted signal at the second node with a mode control threshold to generate the mode control signal.

15. The method of claim 14, wherein the comparison circuit comprises a comparator, and the method further comprises, with the comparator, generating the mode control signal such that if the weighted signal at the second node is greater than the mode control threshold, the mode control signal causes the controller to operate the pull up component and pull down component in the first operational mode.

16. The method of claim 14, wherein the comparison circuit comprises a comparator, and the method further comprises, with the comparator, generating the mode control signal such that if the weighted signal at the second node is less than the mode control threshold, the mode control signal causes the controller to operate the pull up component and pull down component in the second operational mode.

* * * * *